UNITED STATES PATENT OFFICE 2,179,323

COMPOSITION OF MATTER

Willard de C. Crater, Newark, Del., assignor to Hercules Powder Company, Wilmington, Del., a corporation of Delaware No Drawing. Application August 23, 1938,
Serial No. 226,251

5 Claims. (Cl. 52—13)

This invention relates to new compositions of matter and to methods for producing them. More particularly, it relates to new explosive compositions obtained by the nitration of alpha-methyl glycerol in admixture with other polyhydric alcohols, carbohydrates and nitratable carbohydrate derivatives.

I have found that nitration of alpha-methyl glycerol produces a trinitrate characterized by much lower solubility in waste acid than nitroglycerin. Furthermore, I have found that nitration of mixtures of alpha-methyl glycerol with other polyhydric alcohols, carbohydrates, monochlorhydrin derivatives of carbohydrates, etc., produces nitric ester mixtures which are less soluble than nitroglycerin in the waste acid.

Reduction of the amount of nitrated product dissolved in the waste acid is accompanied by several distinct advantages. With the smaller percentage of the nitrated ester in the waste acid, greater stability of the latter is realized. Also, the probability of after separation which may cause "fume-offs" during storage is materially diminished. Furthermore, higher yields of the nitrated ester are obtained since a smaller percentage is lost in the waste acid.

In the nitration of glycerol with mixed acid to yield glycerol trinitrate, approximately 2.5 per cent of the nitroglycerin remains dissolved in the waste acid, causing a hazardous condition therein and reducing the nitroglycerin yield by that amount. Similarly, in the nitration of mixtures of glycerol and ethylene glycol, about 2.5 per cent of the nitrated ester is lost by solution in the waste acid. Further, nitration of mixtures of glycerol and sugar produces waste acids generally containing about 2.75 per cent of nitrated ester. The amount of waste acid obtained in nitroglycerin manufacture is usually about 1.5 times the weight of nitroglycerin. The loss of the nitroglycerin dissolved in the waste acid is, therefore, of material amount.

I have found that the waste acid obtained from nitration of alpha-methyl glycerol with mixed acid contains only about 0.70 per cent dissolved nitrate. Similar nitrations of mixtures of alpha-methyl glycerol and glycerol, ethylene glycol and sugar yield waste acids containing proportionately less nitrated product than obtained without the alpha-methyl glycerol.

My invention may be illustrated by the following example:

Example 1

One hundred and twenty-five parts by weight of a 1:1 mixture by weight of alpha-methyl glycerol and glycerol were added gradually with stirring and cooling to 500 parts by weight of a mixed acid consisting of 50 per cent nitric acid and 50 per cent sulfuric acid. The rate of addition and cooling were such as to maintain a temperature of about 5° C. After the addition was complete and the nitration had taken place, the charge was run into a separator and allowed to stand. Due to the difference in gravity, the nitrated material separated in an upper layer and the waste acid in a lower layer. After separation was complete, the nitrated material was drawn off into an equal volume of water and washed under air agiation at about 40 to 45° C. for 15 minutes. The air was then shut off and the charge allowed to separate, then drawn off. It was washed again in a similar manner with a 5 per cent by weight solution of sodium carbonate to neutralize the remaining acidity. The charge was then allowed to settle for a few hours and drawn off. It was sufficiently dry for use. The mixed acid from the above nitration contained 1.79 per cent of dissolved nitrate.

Additional examples of similar nitrations carried out with alpha-methyl glycerol alone or in admixture with polyhydric alcohols or carbohydrates are given below in the table, together with similar nitrations without the alpha-methyl glycerol.

Table

| Example | 2 | 3 | 4 | 5 | 6 | 7 |
|---|---|---|---|---|---|---|
| | Pct. | Pct. | Pct. | Pct. | Pct. | Pct. |
| Alpha-methyl glycerol | 100 | | | 25 | 40 | |
| Glycerol | | 100 | 60 | 35 | | 40 |
| Ethylene glycol | | | 40 | 40 | 40 | 40 |
| Sugar | | | | | 20 | 20 |
| Nitrate dissolved in waste acid | 0.69 | 2.40 | 2.51 | 2.07 | 1.84 | 2.49 |

From the above examples it will be readily seen that the effect of the alpha-methyl glycerol to reduce the amount of nitrate dissolved in the waste acid is very pronounced and is directly proportional to the amount of alpha-methyl glycerol included in the nitration mixture.

Alpha-methyl glycerol trinitrate prepared in accordance with Example 2 shown in the table had a nitrogen content of 17.13 per cent as compared with 17.43 per cent theoretical. All attempts to crystallize the trinitrate have met with failure. By determining the freezing point of its mixtures with nitroglycerin and extrapolating the curve of freezing points of various mixtures, the freezing point of alpha-methyl glycerol was estimated to be about +4° C.

This property of resisting crystallization is very important in the use of alpha-methyl glycerol trinitrate in explosive compositions. Although ethylene glycol dinitrate has a freezing point of −20° C. and its eutectic point with nitroglycerin is still lower than this, it or the eutectic mixture of it and nitroglycerin is not as resistant to crystallization when these temperatures are reached, particularly in the presence of salts, as is alpha-methyl glycerol trinitrate or eutectic mixtures of alpha-methyl glycerol trinitrate with ethylene glycol dinitrate or nitroglycerin.

It will be appreciated that the above examples are given merely for the purpose of illustration and are not intended to limit my invention. Moreover, many variations in composition and procedure may be made without departing from the scope of the invention.

What I claim and desire to protect by Letters Patent is:

1. As a composition of matter, a nitration product of a mixture of alpha-methyl glycerol, glycerol and sugar.

2. As a composition of matter, a nitration product of a mixture of alpha-methyl glycerol and sugar.

3. As a composition of matter, a nitration product of a mixture of alpha-methyl glycerol, a polyhydric alcohol and a carbohydrate.

4. As a composition of matter, a nitration product of a mixture of alpha-methyl glycerol, ethylene glycol and a sugar.

5. As a composition of matter, a nitration product of a mixture of alpha-methyl glycerol, and a carbohydrate.

WILLARD DE C. CRATER.